Figure 1:
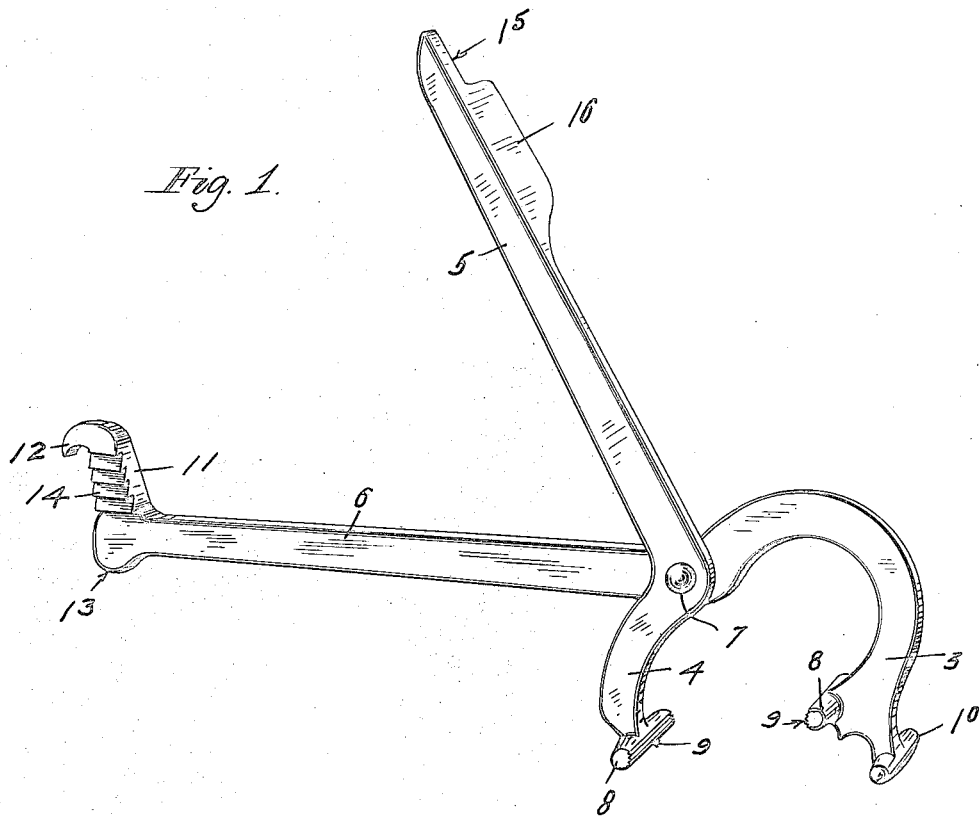

J. BJORNLIE.
TIRE TOOL.
APPLICATION FILED JULY 24, 1920.

1,372,796.

Patented Mar. 29, 1921.

Inventor.
Julius Bjornlie
By his Attorneys

UNITED STATES PATENT OFFICE.

JULIUS BJORNLIE, OF WATERTOWN, SOUTH DAKOTA, ASSIGNOR TO BJORNLIE MANUFACTURING COMPANY, OF WATERTOWN, SOUTH DAKOTA, A CORPORATION OF SOUTH DAKOTA.

TIRE-TOOL.

1,372,796.                    Specification of Letters Patent.     Patented Mar. 29, 1921.

Application filed July 24, 1920. Serial No. 398,723.

*To all whom it may concern:*

Be it known that I, JULIUS BJORNLIE, a citizen of the United States, residing at Watertown, in the county of Codington and State of South Dakota, have invented certain new and useful Improvements in Tire-Tools; and I do hereby declare the following to be a full, clear, and exact description of the invention, such as will enable others skilled in the art to which it appertains to make and use the same.

My present invention has for its object to provide an extremely simple and highly efficient tire tool for use in applying pneumatic tire casings to wheel rims and removing the same therefrom.

To the above end, the invention consists of the novel devices and combinations of devices hereinafter described and defined in the claims.

In the accompanying drawings, which illustrate the invention, like characters indicate like parts throughout the several views.

Figure 2:
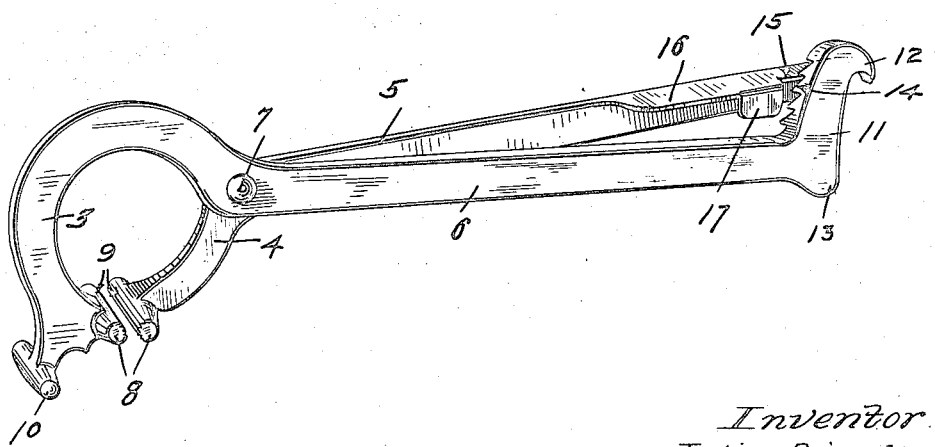

Referring to the drawings:

Figure 1 is a perspective view of the tire tool with the jaws and levers in extreme open position; and Fig. 2 is a corresponding view, with the jaws nearly closed and levers locked to hold said jaws against opening movement.

The numerals 3 and 4 indicate a pair of substantially semi-circular coöperating jaws integrally formed with a pair of levers 5 and 6, respectively, pivotally connected at
7. It is important to note that the jaw 3 is relatively long and extends for more than 180 degrees, and that the jaw 4 is relatively short and extends for considerably less than 180 degrees. By thus forming and connecting the jaws 3 and 4, a lateral sweeping action is given to the free ends thereof, when the levers 5 and 6 are drawn together, which gives great power. Integrally formed with the free ends of the jaws 3 and 4 is a pair of coöperating transversely elongated tire casing-engaging heads 8, the opposing surfaces of which are provided with corrugations 9 to prevent slipping. Also integrally formed with the jaw 3, in the vicinity of its head 8, is an outwardly extended fulcrum lug 10. A finger 11, having on its free end a wheel rim-engaging hook 12, is integrally formed with one edge of the lever 6, at the free end thereof. On the opposite edge of the lever 6, from its finger 11, is a wheel felly-engaging fulcrum lug 13. On the inner face of the finger 11 is formed a multiplicity of ratchet teeth 14 arranged for coöperation with a laterally projecting lock dog 15 on the inner face of the lever 5 to lock the levers 5 and 6 with their jaws closed.

Integrally formed with the inner face of the lever 5 is a laterally projecting tire casing-supporting flange 16 arranged to overlap and rest upon the edge of the lever 6, with which the finger 11 is formed as a base of resistance. On the free edge of the flange 6 is a lip 17 arranged together with the lever 5 to receive therebetween, when both of said levers are closed, the lever 6, to lock the same against lateral separation.

To remove the tire casing from a wheel rim by means of my improved tire tool, the jaws 3 and 4 are first opened to transversely receive the tire casing, and then by closing the levers 5 and 6, the heads 9 are clamped onto opposite sides of the casing just outward of the beads thereof. When the levers 5 and 6 are closed, the dog 15 automatically engages the ratchet teeth 14 and locks the jaws 3 and 4 onto the casing and against opening movement so that the operator does not have to hold the levers pressed together when operating the tool to remove the casing. The levers 5 and 6 are then pulled radially inward toward the axis of the wheel rim to first carry the fulcrum lug 10 against the wheel felly and then lock said levers to strip the tire casing from the wheel rim.

To replace the tire casing on the wheel rim, said casing is first placed on the rim by hand as far as it will go. The tool is then inserted through the tire casing and the hook 12 interlocked with the adjacent flange of the wheel rim with the beads of the tire casing supported on the flange 16, which is directly supported on the lever 6 as a base of resistance. An outward swinging movement of the jaw-equipped ends of the levers 5 and 6 will carry the engaged portion of the tire casing outward of the wheel rim and then laterally onto the same.

The above described tire tool, while extremely simple and of small cost, has, in actual usage, proven highly efficient for the purpose had in view. It will be noted that the tire tool is composed of only three independent elements and, hence, there are few parts to get out of order.

What I claim is:

1. A tire tool comprising a pair of jaw-equipped pivotally connected levers, one of which is provided with a rim-engaging hook, and coöperating lock dog and ratchet teeth on the levers for holding the jaws against opening movement.

2. A tire tool comprising a pair of jaw-equipped pivotally connected levers, one of which is provided with a rim-engaging hook, coöperating lock dog and ratchet teeth on the levers for holding the jaws against opening movement, and a laterally projecting tire-engaging flange on one of said levers arranged to overlap the other of said levers and engage the same as a base of resistance.

3. A tire tool comprising a pair of jaw-equipped pivotally connected levers, one of which is provided with a rim-engaging hook, coöperating lock dog and ratchet teeth on the levers for holding the jaws against opening movement, a laterally projecting tire-engaging flange on one of said levers arranged to overlap the other of said levers and engage the same as a base of resistance, and a lip on said flange arranged together with the respective lever to receive therebetween the other of said levers and lock the two against lateral separation.

In testimony whereof I affix my signature in presence of two witnesses.

JULIUS BJORNLIE.

Witnesses:
  L. T. MORRIS,
  ELMER COLLINS.